Figure 1:
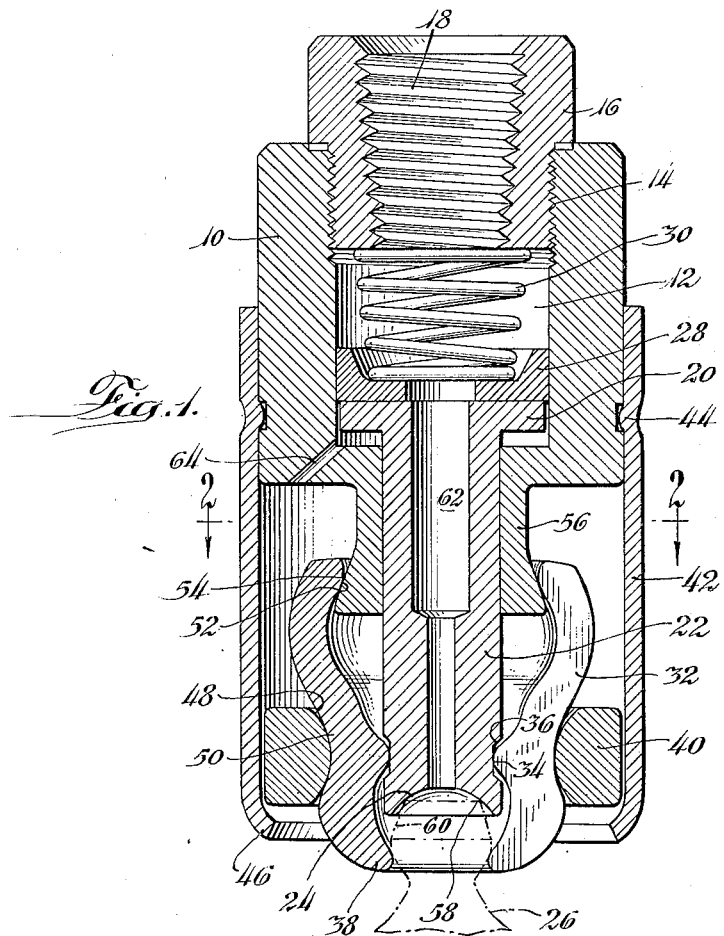

Dec. 12, 1950     H. R. TEAR     2,533,637

LUBRICANT OPERATED COUPLER

Filed Nov. 3, 1948

Inventor:
Harry R. Tear
By Hinkle, Horton, Ahlberg, Harrmann & Kupper
Attorneys.

Patented Dec. 12, 1950

2,533,637

UNITED STATES PATENT OFFICE 2,533,637

LUBRICANT OPERATED COUPLER

Harry R. Tear, Evanston, Ill., assignor to Stewart-Warner Corporation, Chicago, Ill., a corporation of Virginia Application November 3, 1948, Serial No. 58,088

6 Claims. (Cl. 285—169)

My invention relates to lubricant operated couplers and is more particularly concerned with lubricant operated couplers for lubricating apparatus of the kind having the fittings attached to the bearings of automobiles and other machinery and lubricant compressors provided with couplers for successfully making quick detachable connections with the several fittings of an automobile or other machine.

An object of my invention is to provide a new and improved coupler of simple and sturdy construction.

Another object of my invention is to provide a coupler which is lubricant operated and requires only a single sealing means of simple and efficient design and so arranged that it can be readily replaced if desired.

A further object of my invention is to provide a new and improved lubricant operated coupler which provides an initial spring-pressed grip and wherein both sealing means and gripping jaws are responsive to lubricant pressure.

Still another object of my invention is to provide a new and improved lubricant operated coupler wherein the application of the coupler to a fitting effects a yielding retraction and spreading of the jaws to receive the enlarged head of a fitting and wherein such yielding traction is immediately followed by a yielding, gripping, and sealing action.

Another object of my invention is to provide a new and improved lubricant coupler wherein the jaws may be strongly constructed without undue bulk and wherein a large surface is provided about which such jaws can pivot in moving into and out of gripping engagement with a lubricant-receiving fitting.

Other objects and advantages will become apparent as the description proceeds.

Figure 2:
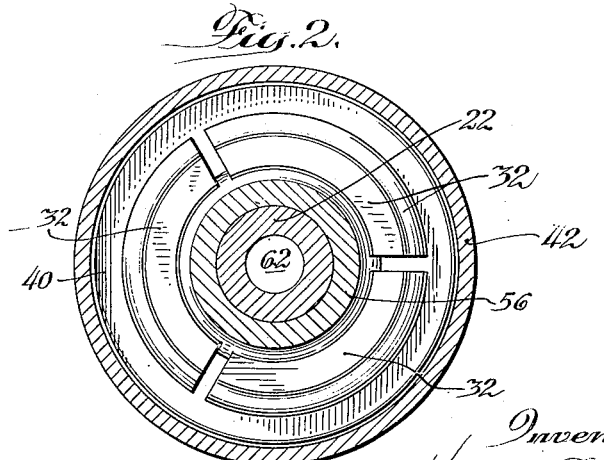

In the drawing:

Fig. 1 is a longitudinal sectional view of a preferred form of lubricant operated coupler embodying my invention; and Fig. 2 is a transverse sectional view taken on the line 2—2 of Fig. 1 and looking in the direction of the arrows.

Referring particularly to Fig. 1, it will be seen that my coupler comprises a base 10 which is illustrated as having a cylinder 12 formed therein and as being provided with threads 14 for receiving a plug 16 or the end of a lubricant-supplying conduit attached to a lubricant compressor or other source of lubricant supply. In the particular form shown, the plug 16 is provided with a threaded bore 18 adapted to be secured to the discharge end of such a lubricant supply conduit.

A piston 20 is reciprocably mounted in the cylinder 12 and has a tubular forward extension 22 terminating in a concavely spherical sealing surface 24 adapted to engage and make a lubricant-tight seal with the end of a lubricant-receiving fitting or nipple 26 indicated in part by dot and dash lines in Fig. 1. A lubricant-tight seal between the piston 20 and wall of the cylinder 12 is effected by a cup-shaped sealing washer 28 of synthetic rubber, leather, or any other suitable material which is resistant to the deteriorating effect of lubricants commonly used in the apparatus for which this coupler is designed. A spring 30 is interposed between the sealing washer 28 and the inner end of the plug 16 and serves to hold the sealing washer 28 firmly against the piston 20 as well as performing additional functions hereinafter described.

A plurality of gripping jaws 32, preferably three in number, are provided to detachably connect the coupler to a lubricant-receiving fitting such as the fitting 26 indicated in Fig. 1. These jaws surround the outlet end of the tubular extension 22 and are held against axial movement with respect to piston 20 and tubular extension 22 by means of jaw projections 34 being located in an annular groove or recess 36 formed in the tubular extension 22 adjacent the outlet end thereof. The jaws 32 have gripping ends 38 and are in the form of levers which pivot about a ring 40 floatingly carried in a sleeve 42 crimped or otherwise suitably attached to the base 10 as indicated at 44. The outer end of the sleeve 42 is turned inwardly as indicated at 46 to prevent ring 40 and jaws 34 from moving out of the sleeve 42. The ring 40 has a broad transversely arcuate inner surface 48 which acts as a fulcrum for the jaws 34 and the latter have correspondingly arcuate surfaces 50 engaging the ring 40 for pivotal movement thereabout. The inner ends of the jaws 32 have frusto-conical surfaces 52 engaging the complementary frusto-conical surface 54 of a sleeve-like extension 56 integral with the base 10. The spring 30 normally urges the piston and jaws outwardly with the inner ends of the jaws engaging the larger diameter of the frusto-conical surface 54 whereby the gripping ends of the jaws are in gripping position. The parts of my novel coupler are preferably so constructed and arranged that when the jaws are in this position the opening formed by the gripping end of the jaws is just large enough to receive the annular edge 58 of the fitting.

When the coupler is applied to a lubricant-receiving fitting, that portion of the tapered surface 60 of the fitting head immediately below the annular edge 58 engages the gripping ends 38 of the jaws whereupon the base 10 of the coupler with its associated frusto-conical surface 54 moves forwardly, thereby permitting the gripping ends of the jaws to spread, whereupon the spring 30 moves the piston 20, jaws 34, and floating fulcrum ring 40 forwardly until the sealing surface 24 engages the end of the fitting and the gripping ends 38 of jaws engage beneath the head of the fitting as shown in Fig. 1. In this position of the parts the spring 30 therefore produces an initial sealing and gripping engagement between the coupler and the lubricant-receiving fitting. By virtue of the fact that the fulcrum ring 40 is not attached to either the piston member or the cylinder member of the coupler, this ring is capable of limited movement lengthwise of the jaws as they pivot about it, thereby providing a maximum bearing surface with minimum friction, stress, and wear.

When the lubricant compressor is operated or lubricant under pressure is otherwise forced into the coupler through the bore and plug 16, the force exerted by the lubricant pressure on sealing washer 28 increases the sealing effect of this washer and also urges the piston 20 outwardly to increase the initial sealing and gripping action produced by the spring 30. The increase in the sealing and gripping action resulting from the introduction of lubricant under pressure into the coupler is proportional to the effective area of the piston and the pressure of the lubricant in cylinder 12 at any given time. The introduction of lubricant under pressure into the cylinder 12 also produces a flow of lubricant through passageway 62 into the lubricant-receiving fitting and bearing parts connected therewith.

When the lubricating operation has been completed the supply of lubricant to the coupler is terminated and the coupler is moved from the fitting by a camming action which spreads the jaws apart and moves the jaws and sealing member inwardly against the tension of spring 30. This camming action is produced by moving the coupler about the end of the fitting until the axis of the coupler is at a sharp angle to the axis of the fitting. In this connection it will be noted that my novel coupler forms a ball and socket joint with the fitting head which permits a considerable degree of misalignment between the coupler and fitting during the lubricating operation. The camming action above referred to is produced only when the coupler is moved at an angle greater than the normal range of misalignment of the coupler with the fitting.

It will be noted that the various parts of my novel coupler are of simple and sturdy construction and are so designed that they may be readily fabricated by conventional mass production machinery. Attention is also called to the fact that a single sealing washer of simple and conventional design is sufficient since my coupler construction is such that there is only a single cylindrical surface which must be maintained in sealing engagement with a piston even though lubricant pressure is utilized to reinforce both the sealing and gripping action. While the problem of sealing the single joint between the piston and cylinder is thus a simple one, I preferably provide a relief duct 64 to permit the escape of any lubricant which might leak past the sealing washer 28.

While I have illustrated and described only a single embodiment of my invention, it is to be understood that my invention is not limited to the precise embodiment shown but may assume numerous other forms and includes all modifications, variations, and equivalents coming within the scope of the appended claims.

I claim:

1. A lubricant operated coupler of the class described comprising a base having a cylinder formed therein, a tubular piston reciprocably mounted in said cylinder and having an outlet end terminating in a sealing surface, a plurality of pivotal gripping jaws, interengaging means provided by said piston and jaws preventing axial movement of said jaws relative to said piston, a floating fulcrum ring engaging said jaws, said ring surrounding a portion of said jaws, a camming surface rigid with said base, each jaw comprising a gripping end and a cam-engaging end, the latter end being positioned to engage said camming surface, a flange provided by said sleeve for limiting outward movement of said fulcrum ring, means for limiting movement of said ring relative to said base, and a spring in said cylinder for urging said piston outwardly to produce an initial sealing and gripping engagement with a lubricant-receiving fitting.

2. A lubricant operated coupler of the class described comprising a base having a cylinder formed therein, a tubular piston reciprocably mounted in said cylinder and having an outlet end in the form of an extension terminating in a sealing surface, a plurality of pivotal gripping jaws, interengaging means provided by said piston and jaws preventing axial movement of said jaws relative to said piston, a sleeve attached to said base and enclosing said jaws and piston, a floating fulcrum ring engaging said jaws, said ring surrounding a portion of said jaws and being movably mounted in said sleeve, a frusto-conical camming surface rigid with said base, each jaw comprising a gripping end and a cam-engaging end, the latter end being positioned to engage said camming surface, a flange provided by said sleeve for limiting outward movement of said fulcrum ring, a cup-shaped sealing washer in said cylinder.

3. A lubricant operated coupler of the class described comprising a base having a cylinder formed therein, a tubular piston reciprocably mounted in said cylinder and having an outlet end in the form of an extension terminating in a sealing surface, a plurality of pivotal gripping jaws, interengaging means provided by said piston and jaws preventing axial movement of said jaws relative to said piston, a sleeve attached to said base and enclosing said jaws and piston, a floating fulcrum ring engaging said jaws, said ring surrounding a portion of said jaws and being movably mounted in said sleeve, a frusto-conical camming surface rigid with said base, each jaw comprising a gripping end and a cam-engaging end, the latter end being positioned to engage said camming surface, a flange provided by said sleeve for limiting outward movement of said fulcrum ring, a cup-shaped sealing washer in said cylinder, and a spring in said cylinder for urging said washer against said piston, said spring also urging said piston outwardly to produce an initial sealing and gripping engagement with a lubricant-receiving fitting.

4. A lubricant operated coupler of the class described comprising a base having a cylinder formed therein, a tubular piston reciprocably mounted in said cylinder and having an outlet end in the form of an extension terminating in a sealing surface, a plurality of pivotal gripping jaws, interengaging means provided by said piston and jaws preventing axial movement of said jaws relative to said piston, a sleeve attached to said base and enclosing said jaws and piston, a floating fulcrum ring engaging said jaws, said ring and jaws having arcuate engaging surfaces, a frusto-conical camming surface rigid with said base, each jaw comprising a gripping end and a cam-engaging end, the latter end being positioned to engage said camming surface, a flange provided by said sleeve for limiting outward movement of said fulcrum ring, a cup-shaped sealing washer in said cylinder and a spring in said cylinder for urging said washer against said piston, said spring also urging said piston outwardly to produce an initial sealing and gripping engagement with a lubricant-receiving fitting.

5. A lubricant operated coupler of the class described comprising a base having a cylinder formed therein, a tubular piston reciprocably mounted in said cylinder and having an outlet end in the form of an extension terminating in a sealing surface, a plurality of pivotal gripping jaws, interengaging means provided by said piston and jaws preventing axial movement of said jaws relative to said piston, a sleeve attached to said base and enclosing said jaws and piston, a floating fulcrum ring engaging said jaws, said ring surrounding a portion of said jaws and being movably mounted in said sleeve, a frusto-conical camming surface rigid with said base, each jaw comprising a gripping end and a cam-engaging end, the latter end being positioned to engage said camming surface, a flange provided by said sleeve for limiting outward movement of said fulcrum ring, a cup-shaped sealing washer in said cylinder, a spring in said cylinder for urging said washer against said piston, said spring also urging said piston outwardly to produce an initial sealing and gripping engagement with a lubricant-receiving fitting, and means providing a vent for said cylinder.

6. A lubricant operated coupler of the class described comprising a cylinder member, a piston member reciprocably mounted in said cylinder member, gripping jaws, means for preventing bodily movement of said gripping jaws relative to one of said members, an annular fulcrum for said gripping jaws, means carried by the other of said members for pivoting said jaws around said fulcrum, and sealing means carried by one of said members, said annular fulcrum being movable relative to both of said members.

HARRY R. TEAR.

REFERENCES CITED

The following references are of record in the file of this patent:

UNITED STATES PATENTS

| Number | Name | Date |
|---|---|---|
| 1,711,870 | Zerk | May 7, 1929 |
| 2,274,753 | Sundholm | Mar. 3, 1942 |
| 2,396,499 | Fitch | Mar. 12, 1946 |